United States Patent [19]
Radke et al.

[11] Patent Number: 6,013,343
[45] Date of Patent: Jan. 11, 2000

[54] PATCH FOR FABRIC AIR TUBES

[76] Inventors: Edgar Helge Fred Radke, 1031 River Road, R.R. No. 1, Massey, Ontario, Canada, POP 1PO; Constantinos J. Joannou, 62 Lortie Street, Aylmer, Quebec, Canada, J9H 4G5

[21] Appl. No.: 08/929,446

[22] Filed: Sep. 15, 1997

[51] Int. Cl.⁷ .................................................... B32B 3/26
[52] U.S. Cl. ................................................ 428/63; 156/64
[58] Field of Search ................................. 428/63; 156/64

[56] References Cited

U.S. PATENT DOCUMENTS

| | | | |
|---|---|---|---|
| 2,956,460 | 10/1960 | Nowotny | 428/63 X |
| 3,325,995 | 6/1967 | Buhro | 60/400 |
| 3,494,820 | 2/1970 | Shewmake | 428/63 |
| 4,025,677 | 5/1977 | Belke | 428/63 |
| 4,588,626 | 5/1986 | Cologna et al. | 428/63 |
| 4,710,249 | 12/1987 | Roberts | 156/64 |
| 5,034,254 | 7/1991 | Cologna et al. | 428/63 |

*Primary Examiner*—Archene Turner
*Attorney, Agent, or Firm*—David French

[57] ABSTRACT

A patch for a ducting wall has two sealing portions, one of which may be bent to pass through a torn opening in the ducting wall. When jointed by a coupling means, the two sealing portions may pinch the ducting wall surrounding the torn opening and provide a barrier against the escape of air through the opening.

19 Claims, 6 Drawing Sheets

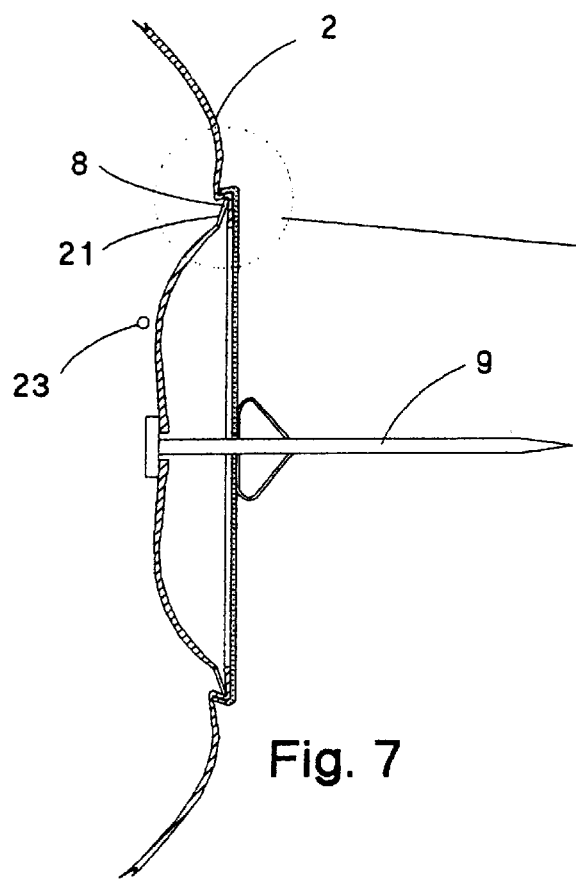
Fig. 7
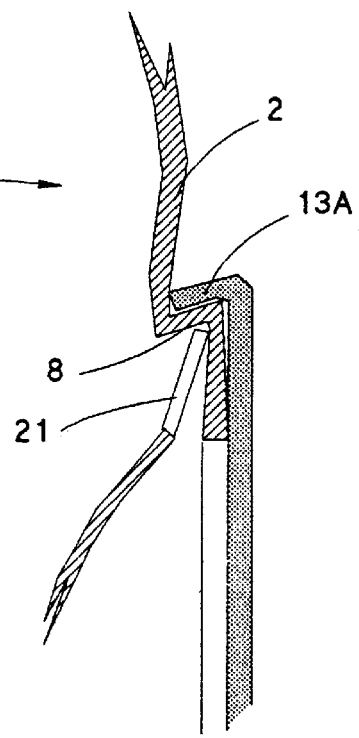
Fig. 7A
Fig. 8
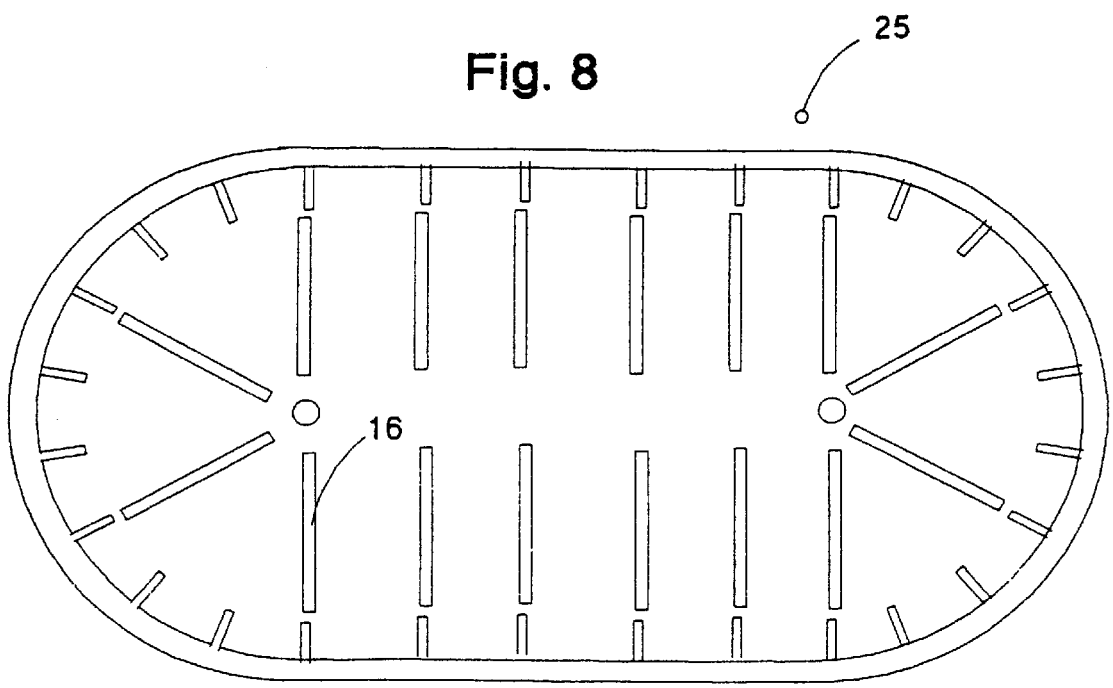

PATCH FOR FABRIC AIR TUBES

FIELD OF THE INVENTION

This invention relates to ducts, conduits and fabric air tubes used in mines and the like. More particularly, it addresses a patch for closing tears, rips and other openings in the walls of such conduits.

BACKGROUND TO THE INVENTION

In mines and other locations large volumes of air are typically delivered to a work site through fabric tubes. Such tubes are generally in the range of 1 foot to 4 feet in diameter. Because they are basically made of fabric that is either air supported or stretched over a supporting wire frame, the fabric covering is susceptible to being ripped or torn. When this occurs, air leaks out, reducing delivery of air to the location of the work site where it was intended to be delivered.

While small tears in such ducting can be tolerated, eventually as they accumulate, they must be addressed. Traditional means of repairing cuts has been by stitching and/or use of adhesive patches. Often, the main air supply fan must be turned down or off while such repairs are being made. This can disrupt the progress of work at the job site.

In U.S. Pat. No. 3,494,820 to Shewmake a patch for repairing inflated articles is depicted. A plug of flexible material carrying expandable flaps is partially inserted through a rupture opening. Gas pressure binds the flaps in place in conjunction with adhesive.

In U.S. Pat. No. 5,034,254 to Cologas a blind-side panel repair patch utilizes a flexible washer, carried by a bolt, that is pushed through a hole. Inner and outer steel washers compact resin-impregnated sealing elements in place to close-off the opening.

U.S. Pat. No. 4,025,677 to Belke shows a temporary patch for a crack in the wall of a container that relies upon a suction cup as a form and quick setting adhesive to close the opening.

U.S. Pat. No. 2,956,460 to Nowotny shows a patching apparatus in the form of a plunger that inserts an expanding plug through a hole to be sealed in a tire. A bonding agent fixes the plug in place.

U.S. Pat. No. 4,710,249 to Roberts also shows a tire repair plug wherein a plug is provided with a circular flange. The plug core is pulled through the tire hole from the interior until the flange is in position on the inside surface of the tire, surrounding the hole.

In U.S. Pat. No. 3,325,995 to Buhro a mechanically-expanding, folded membrane is inserted through a hole in a collapsed format to be opened like an umbrella to patch an opening in a wall. The expanded membrane serves as a form to contain patching material applied to the hold.

A more effective means to repair cuts and tears in ducting and conduits generally is required.

An opportunity exists to provide a new patching system for ducting and the like based upon reliance on compressive "pinching" forces.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention is based upon the use of two cooperative sealing means to form a barrier around a tear or puncture in the wall of ducting. One of the sealing means is flexible and may be bent so as to reduce its aspect ratio. Such sealing means is selected to be of a size which:

(1) when bent can be passed through a torn opening in the ducting; and
(2) when expanded will span the torn opening in the ducting. coupling means, preferably in the form of a rod with an A enlarged end is partially passed through the torn opening with the bendable sealing means. Once the bendable sealing means is re-expanded to an opening-spanning size, the rod is used to position it in place around the torn opening.

The second sealing means is then juxtaposed on the outside of the ducting opposite to the first sealing means to provide for the pinching therebetween of the ducting material surrounding the opening. One of the two sealing means at least provides a solid surface that functions as an air barrier. Preferably, when an over-pressure exists within the ducting, the sealing means within the ducting carries the air barrier.

The coupling means is used to apply the pinching force developed between the two sealing means on the ducting wall, and is coupled to the second sealing means to ensure that the pinching force continues to be applied.

Preferably, the first sealing means is generally dome-like or somewhat hemispherical in shape with a central hole to receive the coupling rod. The counterpart, second, sealing means may be generally dome-like or flat itself, with a similar central hole to receive the coupling rod. Both sealing parts should be sufficiently rigid to provide a sustained pinching force around an outer, peripheral boundary when these two parts are drawn towards each other.

Stiffness may be imparted to the sealing means by the presence of ribs, or through use of corrugations when a solid surface is present. Stiffness may also be imparted by employing a curved dome-like shape. When only one of the sealing means provides the air barrier, the other sealing means may be reduced to an open webbing having ribs and a pressure-applying rim that engages the complementary sealing means to provide the pinching effect.

The pinching effect may arise by the direct application of pressure between the two surfaces containing the fabric or ducting wall portion that surrounds the opening to be repaired. Alternately, this effect may be enhanced by causing the fabric or ducting wall to conform to a tortuous path while passing through the pinched region.

One means of providing a partially tortuous path is to equip one of the sealing means with a lip or flange adjacent to the pinched zone. A further more tortuous path may be provided by causing the outer edge of one sealing means to tend to expand towards a lip formed on the other sealing means. Thus, for example, a dome-like first sealing means may have a circular outer periphery that is interrupted by radial cut lines that allow segments of the periphery to expand outwardly upon the application of pressure to the domed-body of the first sealing means. The lip formed on the second sealing means may be inwardly inclined so that fabric or ducting wall caught between the expanding peripheral segments of the first sealing means and the overhanging lip of the second means is forced to follow an exaggerated "S"-shaped curvature path.

By providing a patch of this design, rapid repairs may be made on torn ducting, even with the air fan operating at high capacity.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

FIG. 7 shows a cross-sectional view of the sealing means of FIG. 5C engaging fabric duct wall between its edges and the flanged rim on the counterpart sealing means of FIG. 6.

FIG. 7A is a detailed cross-section of the pinching region of FIG. 7.

FIG. 8 is a plan view of an elongate dome-like sealing means with ribs and split edges.

DESCRIPTION OF THE PREFERRED EMBODIMENT

Figure 1:
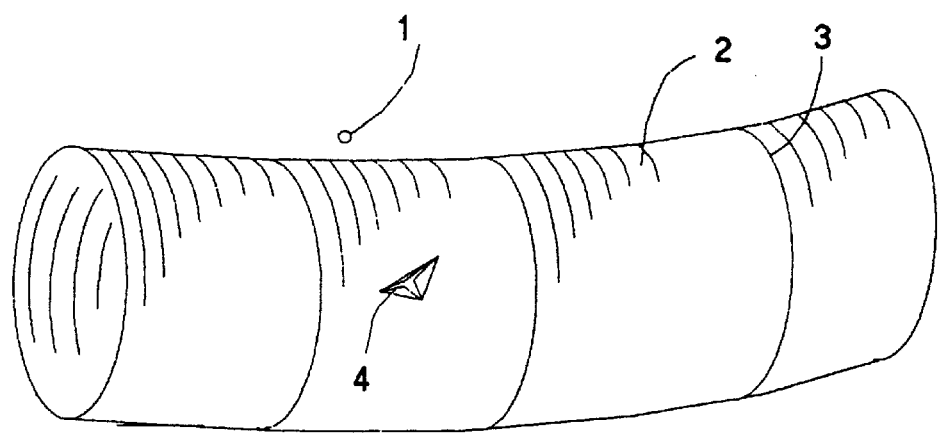
FIG. 1 is a pictorial view of a fabric air duct with a torn opening.

In FIG. 1 an air duct 1 with a fabric covering as the ducting wall 2 supported by internal wires 3 has a torn opening 4. Such wires 3 may optionally be employed, particularly at bends. Otherwise a fabric air duct 1 may be self supporting.

Figure 2:
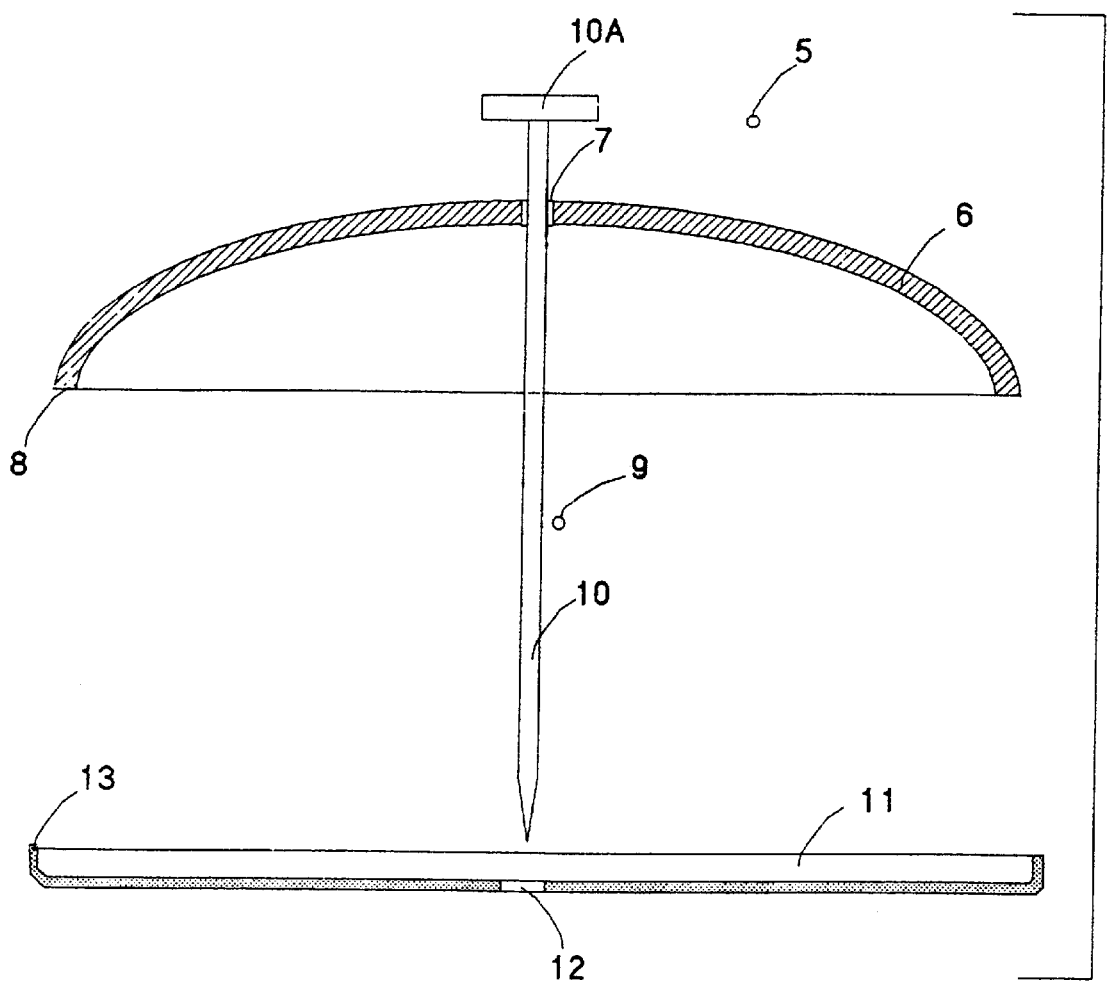
FIG. 2 is a partial cross-sectional view of a domed first sealing means, a flat second sealing means and a coupling pin all positioned for assembly.

In FIG. 2 a patch 5 has a first sealing means 6 in the form of a partial dome with a central hole 7 and a peripheral edge 8. A coupling means 9 in the form of a pin 9 with a shaft 10 and head 10A pierces the central hole 7.

Aligned with the pin 9 is the counter-part second sealing means 11 having a central hole 12 and circumferential flange or lip 13. Collectively, the first 6 and second 11 sealing means serve to clamp the patch 5 to the ducting wall 2.

Figure 3:
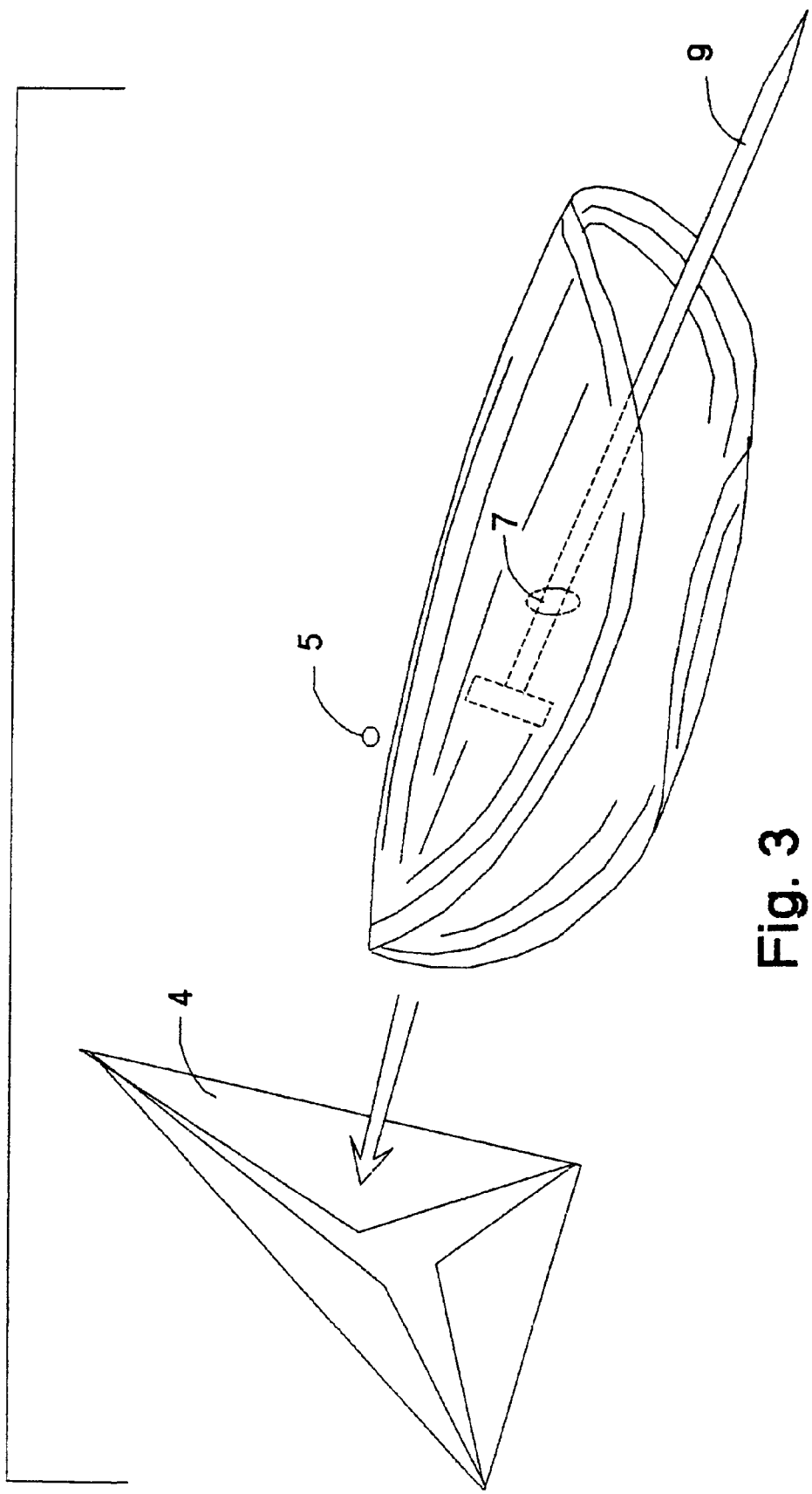
FIG. 3 depicts pictorially the first sealing means of FIG. 2, with pin in place, bent and deformed to compress it for passage through the torn opening in a ducting wall.

In FIG. 3 the domed sealing means 5 with the pin 9 skewed sideways is bent to allow it to pass through the torn opening 4.

Figure 4B:
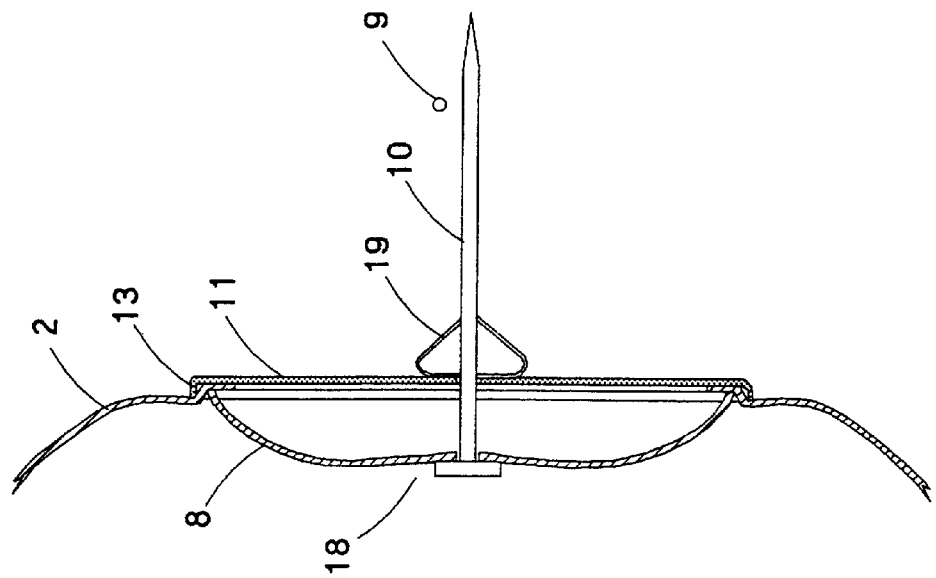
FIG. 4B is the view of FIG. 4A after pinched engagement with the fabric has been effected.
Figure 4A:
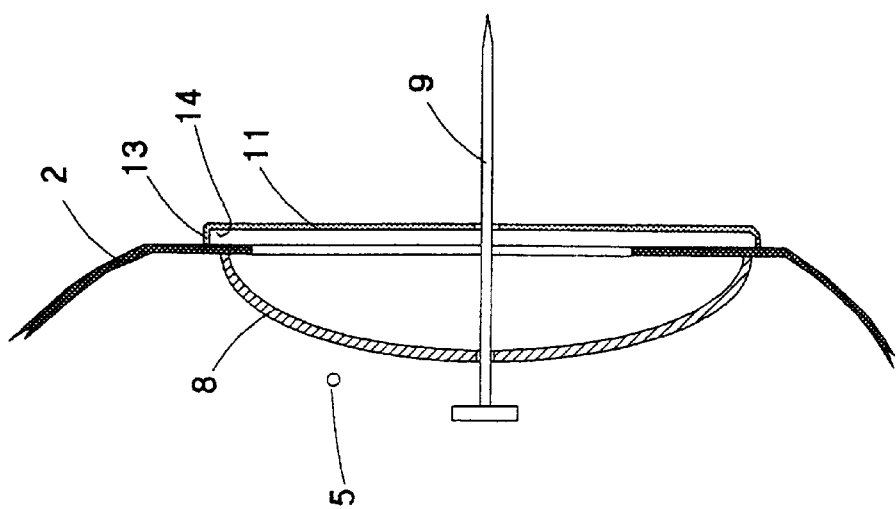
FIG. 4A is a cross-sectional view of a ducting wall of fabric with the invention of FIG. 2 positioned for subsequently pinching upon the ducting surface fabric.

In FIG. 4A the first domed sealing means 6 is positioned through manipulation of the pin 9 to bear opposite the counterpart second sealing means 11 proximate to the flange 13. The objective is to trap the fabric covering 2 of the duct 1 by a pinching or compressive action between the peripheral edge 8 of the first sealing means 6 and the bearing surface 14 of the counterpart second sealing means 11.

In FIG. 4B, the pin 9 has been drawn by thrusting against the counterpart second sealing means 11 to cause the first sealing means 6 to pinch the fabric 4 between the peripheral edge 8 of the first sealing means 6 and the bearing surface 14 of the counterpart second sealing means. The fabric will conform in an "S"-shaped path as it spans the optional lip 13 and peripheral edge 8. A push-nut 19 or the like secures the shaft 10 of the pin 9 against the counterpart second sealing means 11 in order to ensure that the pinching engagement is sustained.

Figure 5A:
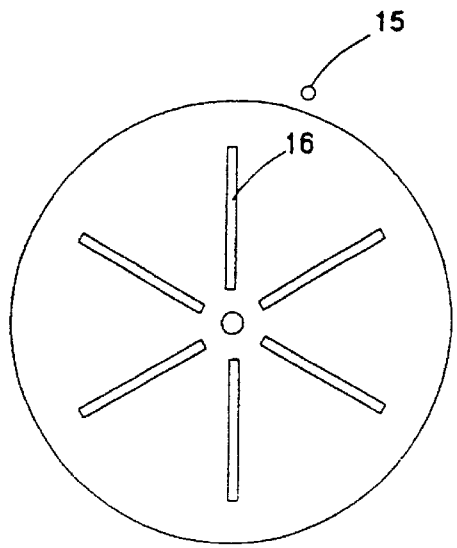
FIG. 5A is a variant of a solid, dome shaped sealing means with reinforcing ribs.

FIG. 5A shows a dome-like sealing means 15 with raised ribs 16. These ribs stiffen the sealing means to resist deflection 18 present upon application of a pinching force as, shown in FIG. 4B.

Figure 5B:
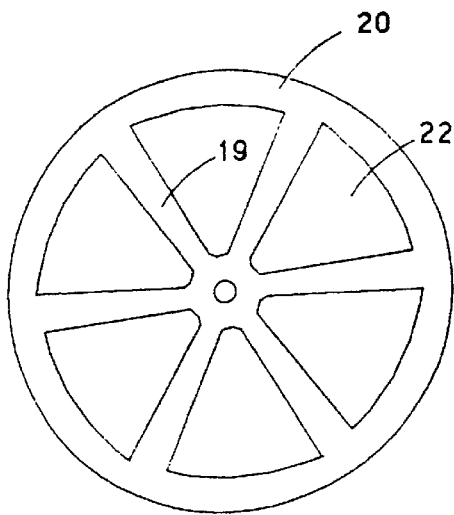
FIG. 5B is a variant of an open, dome shaped sealing means with spider-like ribs.

In FIG. 5B the ribs 19 only provide the domed shape, terminating at a peripheral ring 20. Between the ribs 19 are open spaces 22. Even this ring 20 may be interrupted or discontinuous so long as it provides sufficient bearing surface and force to pinch the fabric 4. Either the first or second sealing means 6, 11 may provide a solid surface to act as the air barrier, the other having openings 22. If the inner sealing means carries the air barrier, an over pressure within the ducting 1 will press the inner sealing means against the fabric 2.

Figure 5C:
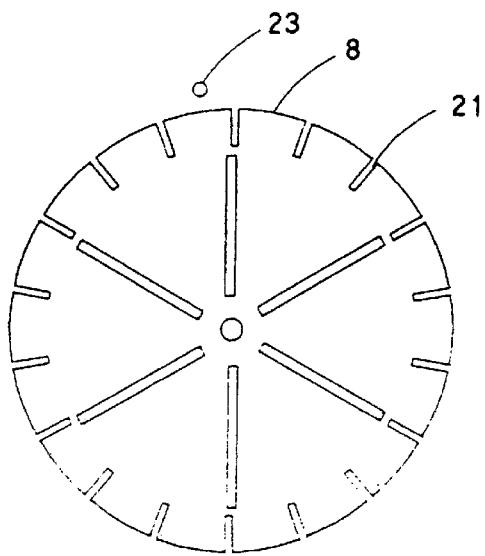
FIG. 5C is the variant of FIG. 5A with cut edges formed in the outer periphery of the dome.

In FIG. 5C the peripheral edge 8 of the domed sealing means 23 of FIG. 5A has generally radially cut edges 21 distributed along its length. Their function is shown in FIG. 7.

Figure 6:
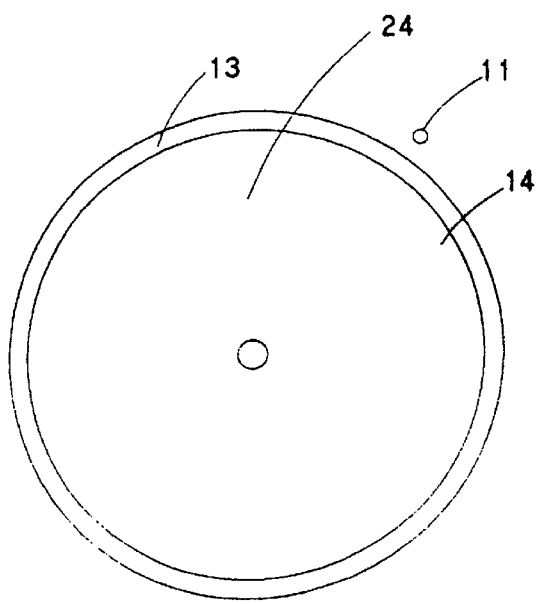
FIG. 6 is a top view of a disc-shaped counterpart sealing means with a peripheral flange or lip.

In FIG. 6 a counterpart sealing means 11 of disc-like shape having an overall solid surface 24 carrying bearing surface 14 with an outer flange 13 is shown. This solid surface 24 serves as the air barrier 24. It may be replaced by an open web as in FIG. 5B so long as one or other of the sealing means is sufficiently solid so as to provide an air barrier 24.

In FIG. 7 the domed, split-edge, sealing means 23 of FIG. 5C is shown engaged with ducting wall 2 as in FIG. 4B, except that due to the fact that the cut edges 21 are deflected outwardly by the compressive force of the rod 9, the peripheral edge 8 is forced to tend to underlie the slightly inwardly inclined flange 13A. The effect is to pinch the fabric 2 in a more exaggerated "S"-shape formation, as is apparent in FIG. 7A.

In FIG. 8 a variant in the shape of a sealing means is shown. In this case the domed shape of FIG. 5C has been elongated into an oval-shaped sealing means 25. With a correspondingly shaped counterpart, such a sealing means 25 can be applied over more lengthy tears in a duct surface.

Figure 9:
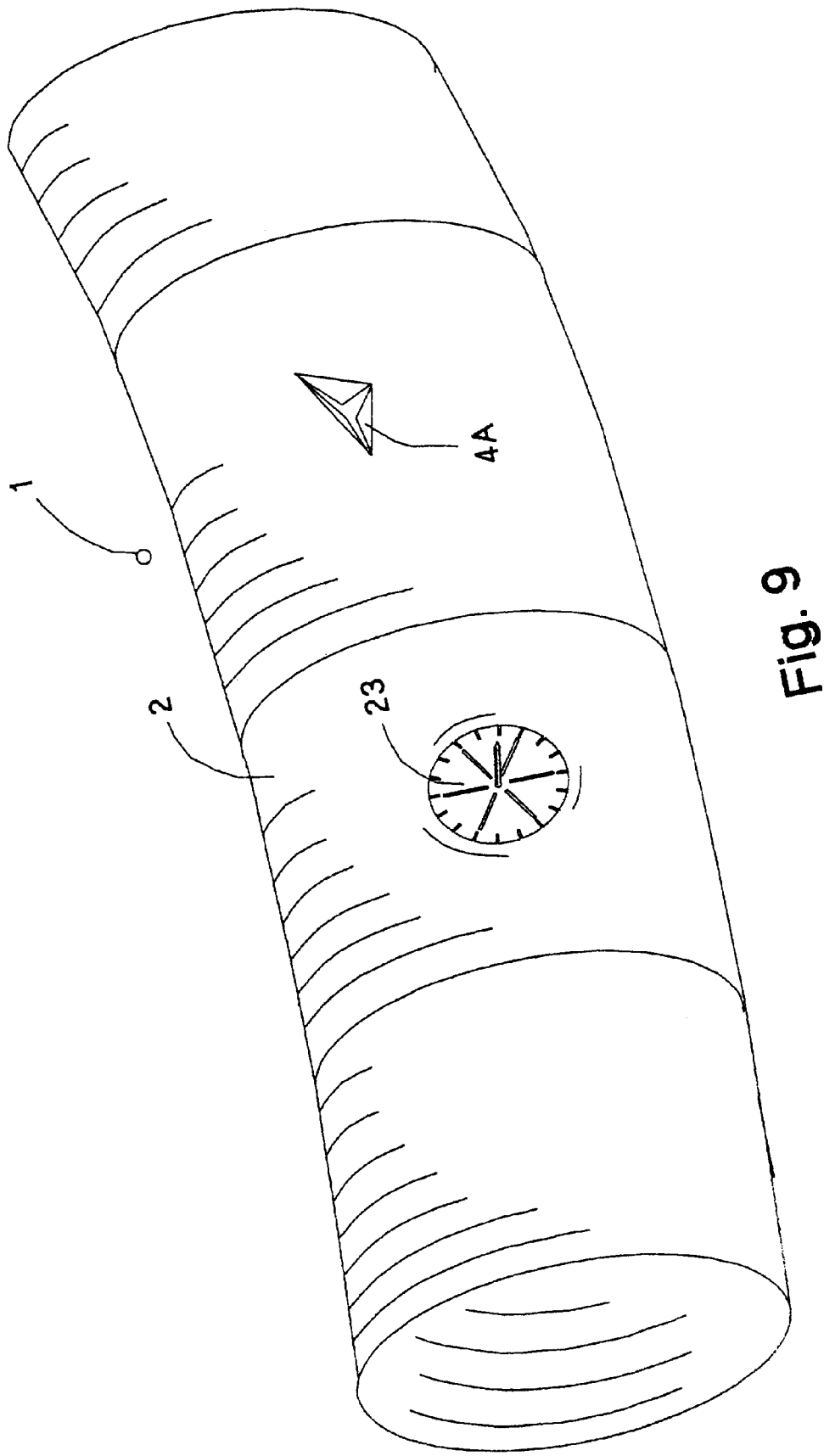
FIG. 9 is a pictorial view of ducting with a sealing means deployed to close-off a torn opening.

In FIG. 9 the domed sealing means 23 of FIG. 5C is shown installed in place on a duct 1 closing a tear (not shown-concealed). A similar unclosed tear 4A in an adjacent region of the duct 1 is, however, shown. In this FIG. 9 a domed exterior sealing means 23 is depicted, the counterpart 11 within the interior of the duct 1 being optionally flat. In such case, the counterpart sealing means 11 must be flexible in order to pass through the torn opening 4. It must also be large enough to span such opening 4 when re-expanded.

The preferred material for the components of this patching system is a polymeric plastic, such as polyethylene. The components may be vacuum-formed, injection molded or otherwise produced by known methods. The key characteristics are that one of the sealing means must be insertable through the torn opening 4 and the respective parts must pinch the duct wall 2 surrounding the torn opening 4 with sufficient force to remain in place over time, and provide a barrier against escaping air.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property are claimed are as follows:

1. A patch for sealing an opening in a thin wall of pinchable material comprising:

(1) two cooperative sealing means positioned on opposite sides of said wall at said opening, at least one of the sealing means being sufficiently flexible to be bent and being of a size which:

(a) when bent can be passed through an opening in the wall; and (b) when expanded will span the opening in the wall; both sealing means being sufficiently rigid to provide at their peripheries a sustained pinching force on the wall;

(2) air barrier means carried by at least one of said sealing means to block passage of air through said opening; and (3) coupling means extending between said first and second sealing means to provide said sustained pinching force on the pinched wall, wherein at least one, first, of said sealing means is generally dome-like in shape with a peripheral edge that is of such a dimension as to mate, when the dome is not bent, with the second sealing means, when the second sealing means is not bent, and effect sealing of said opening.

2. A patch as in claim 1 wherein the second sealing means is a generally flat disc with a central hole to receive the shaft of the coupling rod and said second sealing means has an outer circumferential edge dimensioned to mate with the first dome-like sealing means along its peripheral edge to apply said sustained pinching force.

3. A patch as in claim 1 wherein the coupling means comprises a rod with a shaft having an enlarged end, said shaft being positioned to pass through holes in said respective sealing means to transmit the sustained pinching force.

4. A patch as in claim 2 wherein the coupling means comprises a rod with a shaft having an enlarged end, said shaft being positioned to pass through holes in said respective sealing means to transmit the sustained pinching force.

5. A patch as in claim 2 wherein the circumferential edge of the second sealing means is of a larger diameter than the width of the first, dome-like sealing means, and is provided with a flange to cause the pinched wall of pinchable material to conform to a tortuous path while passing between the two sealing means.

6. A patch as in claim 5 wherein the peripheral edge of the first, dome-like, sealing means is interrupted by generally radial cuts to allow said peripheral edge to expand towards the flange formed on the second sealing means upon the application of a pinching force between said sealing means.

7. A patch as in claim 5 wherein said flange has an inwardly inclined outer lip, whereby material pinched therebetween with be forced to confirm to an "S"-shaped curvature path.

8. A patch as in claim 1 in combination with a duct having said thin wall, the wall comprising a flexible fabric.

9. A patch as in claim 2 in combination with a duct having said thin wall, the wall comprising a flexible fabric.

10. A patch as in claim 3 in combination with a duct having said thin wall, the wall comprising a flexible fabric.

11. A patch as in claim 4 in combination with a duct having said thin wall, the wall comprising a flexible fabric.

12. A patch as in claim 1 wherein at least one of the sealing means is provided with ribs to enhance its rigidity.

13. A patch as in claim 2 wherein at least one of the sealing means is provided with ribs to enhance its rigidity.

14. A patch as in claim 3 wherein at least one of the sealing means is provided with ribs to enhance its rigidity.

15. A patch as in claim 4 wherein at least one of the sealing means is provided with ribs to enhance its rigidity.

16. A patch as in claim 1 wherein at least one of the sealing means is provided with corrugations to enhance its rigidity.

17. A patch as in claim 2 wherein at least one of the sealing means is provided with corrugations to enhance its rigidity.

18. A patch as in claim 3 wherein at least one of the sealing means is provided with corrugations to enhance its rigidity.

19. A patch as in claim 4 wherein at least one of the sealing means is provided with corrugations to enhance its rigidity.

* * * * *